UNITED STATES PATENT OFFICE.

ANDREW GLASSEL DICKINSON, OF NEW YORK, N. Y.

ARTIFICIAL STONE.

SPECIFICATION forming part of Letters Patent No. 387,344, dated August 7, 1888.

Application filed June 12, 1888. Serial No. 276,849. (No specimens.)

*To all whom it may concern:*

Be it known that I, ANDREW GLASSEL DICKINSON, a citizen of the United States, and a resident of the city, county, and State of New York, have invented certain new and useful Improvements in Artificial Stone, of which the following is a specification.

My invention relates to that class of mixtures or compositions used in the manufacture of artificial substitutes for stone; and my invention consists of a composition composed of ingredients specified and combined, as fully set forth hereinafter.

In preparing my composition I use cement— as, for instance, Portland cement—alkali, silica, crushed stone or gravel, and a coloring material in connection with a solution of sulphuric acid, muriate of soda, and a solution of caoutchouc or rosin with glue and gallic acid.

The cement is mixed with a solution of alkali—as potash or pearl-ash—and sand or ground silica is added. The crushed stone or gravel is washed with weak sulphuric acid, and is then added to the cement mixture together with a small portion of muriate of soda and any suitable coloring material. For outside work a solution of caoutchouc in naphtha or other solvent is added to the mixture; but for inside work a solution of rosin may be used instead of the caoutchouc, together with glue and gallic acid. The proportions of these ingredients will vary according to the character of the mixture and the purpose for which it is to be used.

In one preparation the proportions will be as follows: cement, ten parts; sand or silica, ten parts. These are mixed together with a strong solution of alkali until the mixture is of about the consistency of thin paste. The coloring-matter is then added, together with the crushed stone, until the consistency of the mixture is about that of ordinary mortar. When the material is to be used, the solution of caoutchouc and rosin and glue and gallic acid are added, the proportions of the material in the solution being such as will secure the strongest possible solution, and the amount of solution to the amount of the mixture varying according to circumstances, ten per cent. being sufficient for ordinary purposes. After the material is thus prepared it is cast into molds or applied to surfaces to be coated, or used as a filling for the hollow blocks of wood pavements, or for other purposes, as may be required.

Without limiting myself to the precise proportions specified, I claim—

A composition of matter to form an artificial stone, consisting of cement, alkali in solution, silica, crushed stone or gravel, muriate of soda, caoutchouc or rosin, and glue and gallic acid, substantially as set forth.

In testimony whereof I have signed my name to this specification in the presence of two subscribing witnesses.

ANDREW GLASSEL DICKINSON.

Witnesses:
I. SANCHEE,
C. W. CONSBACHER.